United States Patent [19]

Franci

[11] Patent Number: 5,464,877
[45] Date of Patent: Nov. 7, 1995

[54] METHOD FOR RECOVERING A SYNTHETIC WASTE MATERIAL CONTAMINATED WITH OTHER MATERIALS

[75] Inventor: François-Marie Franci, Pontault-Combault, France

[73] Assignee: Helverep S.A., Switzerland

[21] Appl. No.: 204,159

[22] PCT Filed: Jul. 2, 1993

[86] PCT No.: PCT/CH93/00169

§ 371 Date: Mar. 24, 1994

§ 102(e) Date: Mar. 24, 1994

[87] PCT Pub. No.: WO94/01491

PCT Pub. Date: Jan. 20, 1994

[30] Foreign Application Priority Data

Jul. 3, 1992 [FR] France ................................. 92 08413

[51] Int. Cl.⁶ .............................. C08J 11/04; C08J 11/06; B29B 17/02
[52] U.S. Cl. .............................. 521/48; 521/40; 521/42.5; 521/43.5; 521/44; 521/46; 521/46.5; 521/48.5
[58] Field of Search .............................. 521/48, 48.5, 46, 521/46.5, 40, 42.5, 43.5, 44

[56] References Cited

U.S. PATENT DOCUMENTS

| | | | |
|---|---|---|---|
| 4,368,274 | 1/1983 | Scott | 521/48 |
| 4,602,046 | 7/1986 | Buser et al. | 521/48 |
| 4,799,954 | 1/1989 | Hochberg | 521/48 |
| 5,214,072 | 5/1993 | Fennhoff et al. | 521/48 |
| 5,248,041 | 9/1993 | Deiringer et al. | 521/48 |

FOREIGN PATENT DOCUMENTS

| | | |
|---|---|---|
| 3511711 | 10/1986 | Germany. |
| 53112979 | 10/1978 | Japan. |
| 2130124 | 5/1984 | United Kingdom. |

OTHER PUBLICATIONS

Chemical Abstracts, vol. 90, No.: 6, 1979, Columbus, Ohio, U.S.; abstract No.: 39898g, Sadayoshi & Al. 'recovery of base films from magnetic recording materials' see abstract.

Primary Examiner—Paul R. Michl
Assistant Examiner—Olga Asinovsky
Attorney, Agent, or Firm—Davis, Bujold & Streck

[57] ABSTRACT

A method for recovering a synthetic waste material contaminated with other materials, particularly waste optical disks, wherein the loose, uncrushed waste is chemically treated by impregnating said other materials with a chemical solution which attacks these materials but is substantially neutral for the synthetic material, and mechanically treated by tumbling said waste in a sealed rotary drum to dislodge the contaminated and chemically attacked materials from said synthetic material.

11 Claims, 1 Drawing Sheet

METHOD FOR RECOVERING A SYNTHETIC WASTE MATERIAL CONTAMINATED WITH OTHER MATERIALS

BACKGROUND OF THE INVENTION

The present invention concerns a method for recovering synthetic waste material contaminated with other materials, by means of a chemical treatment consisting of impregnating the materials with a substance which attacks the contaminant material but is substantially neutral toward the synthetic material, and a simultaneous mechanical treatment consisting of tumbling the loose, uncrushed waste material in a hermetically sealed drum.

The synthetic waste material is usually contaminated with other materials such as one or more dyes, printing ink, metal coatings, paper or other types of tags, glue, etc. "Clean" recycling requires that the synthetic base material be free of contaminants before re-use.

Current attempts to recover such material consist of a chemical treatment during which the waste is submerged in an aggressive solution for a variable length of time in order to neutralize the contaminant material. During such treatment the solution impregnates synthetic material, which is thus partially degraded and often cannot be used again.

As the price of base materials increases, recycling synthetic materials becomes more and more important. The polycarbonate used in the manufacture of optical character reading disks is one of the more desirable materials to recycle.

Various attempts have been made to recycle polycarbonate and other synthetic materials. One such example is described in German Patent Application No. DE A 85 11 711, which describes a method of recovering synthetic waste from optical character reading disks wherein the previously crushed waste is submerged in a chemical bath consisting of several substances with solvent properties.

U.S. Pat. No. 4,802,048 describes a method for treating pieces of synthetic material coated with at least one layer of a macromolecular organic polymer, wherein the particles are first finely ground and then tumbled in a caustic soda solution. The mixture consists of 25% solid material and 75% alkaline solution.

A major drawback with all these known methods is that the previously ground or microminiaturized material for recycling is immersed in an aggressive solution, which, while successfully removing the unwanted material, also impregnates the material to be recycled.

SUMMARY OF THE INVENTION

The present invention proposes overcoming this disadvantage by providing a method which effectively treats the waste synthetic material while preventing the degradation which occurs when aggressive substances are used for treatment.

To achieve this the method of the invention is characterized by the fact that the quantity of chemical solution comprises from 2 to 5% of the weight of the quantity of waste treated.

When the waste material is an optical character reading disk With a polycarbonate base, said chemical solution preferably is composed of 20% caustic soda at 38° C. and water, with the treatment lasting from 3 to 5 hours.

In a preferred embodiment of the method, at least one rinsing procedure is performed using a volume of liquid which comprises from 25% to 100% of the volume of treated waste, followed by drying the waste with hot air.

Advantageously, the rinse liquid is then filtered using a plate filter.

In one advantageous embodiment of the method, the chemical and mechanical treatments take place in a first rotary drum, rinsing and drying in a second rotary drum, and the waste is crushed after rinsing and drying. The invention will be better understood with reference to the description of one embodiment of the method and one advantageous embodiment of the device used in said method.

BRIEF DESCRIPTION OF THE DRAWINGS

A device is shown in FIG. 1 as a diagrammatic schematic and will be described in greater detail below.

DESCRIPTION OF THE PREFERRED EMBODIMENT

Figure 1:
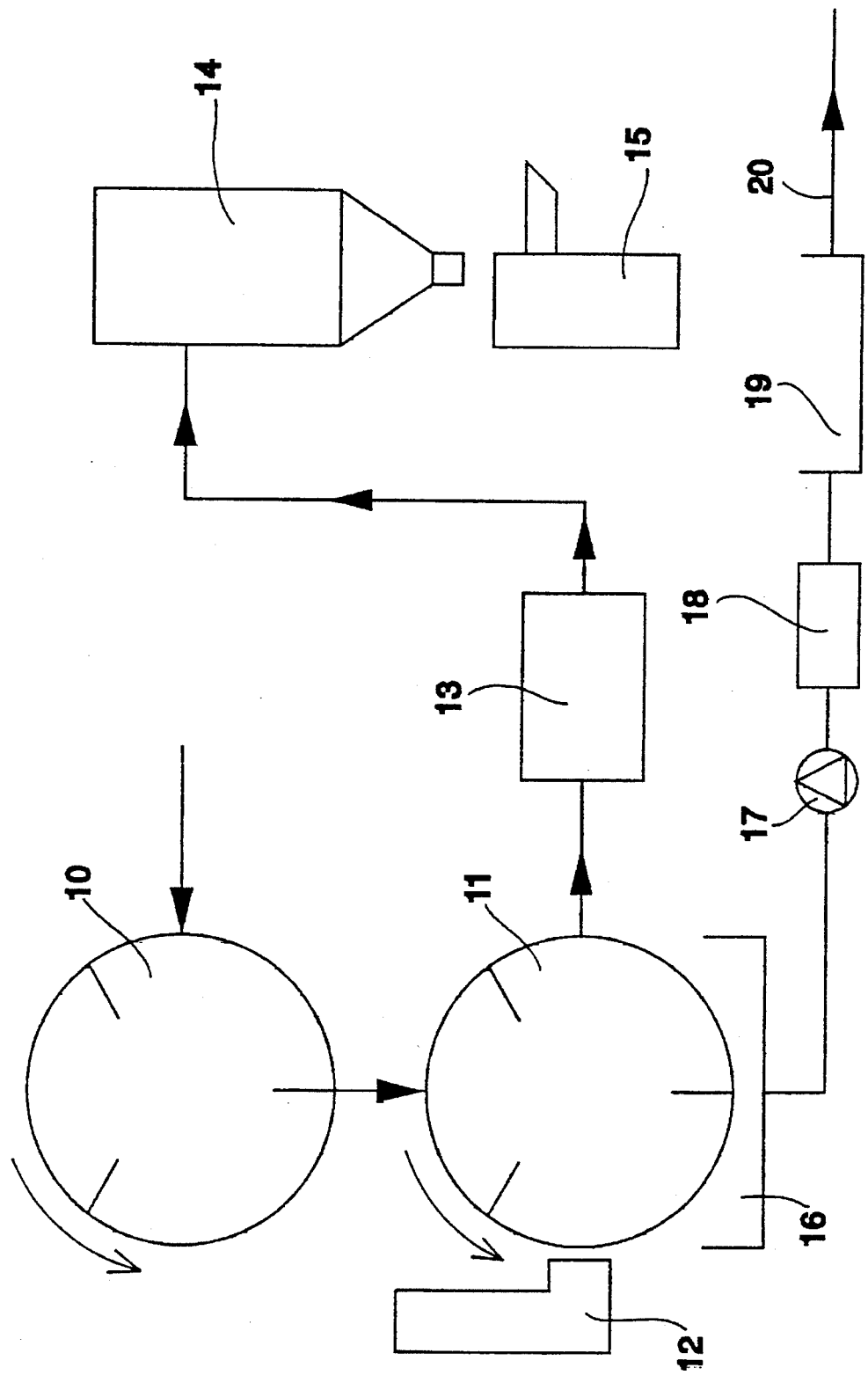

The method comprises a combination of chemically treating the contaminant materials which adhere to the synthetic material for recycling with a mechanical recovery process, tumbling the product in a rotary drum. Since only a small quantity of aggressive chemical solution is used in relation to the volume of products treated, the products are merely coated with the solution and never impregnated with it. In fact, even if a portion of the waste material is temporarily submerged, it immediately emerges due to the rotation of the drum. After this short submersion phase the treated products are dried by draining. For this reason the solution affects only the surface, that is, only the contaminant materials, and does not cause degradation of the valuable synthetic material, i.e., the material which is to be recycled.

The impacts caused by tumbling the waste material dislodge the adhering materials, already attacked and weakened by the chemical solution. These materials are dislodged from the surface of the treated waste and become insignificant in size as they are subjected to the multitude of impacts. A final rinse followed by one or more filtrations eliminates them totally.

The aggressive chemical solution used depends upon the materials to be eliminated and may vary according to how resistant the synthetic material is to the treatment solution.

As mentioned above, one synthetic material which is valuable for recycling is the polycarbonate used as a base for optical character reading disks. One side of these disks is printed and the other has an aluminum film protected by a layer of resin.

Conclusive experiments have been performed with two cubic meter quantities of waste optical disks introduced into a rotary drum with a six cubic meter capacity. The chemical solution consists of 20% caustic soda at 38° C. and 80% water. The volume of solution introduced into the drum is 20 liters, approximately 2% of the total waste weight. Drum rotation speed is regulated so that the waste material rotates around approximately ¾ of the drum diameter for optimal tumbling.

It is observed that the aluminum layer degrades very rapidly and the printing ink forms flakes which detach from the disk surface. The particles of detached materials become insignificant in size and the chemical solution progressively transforms into a homogeneous "juice" containing the contaminant particles. The operation takes about four and one-half hours. The next step is rinsing with water, also in a rotary drum, followed by filtration. If necessary several rinsing and filtration procedures are utilized.

The solution used may of course be varied according to the type of waste treated. Nevertheless, the treatment principles remain identical in every instance. Chemical treatment is combined with mechanical treatment, and only a small amount of chemical solution is used so that the synthetic material is merely coated, and not submerged for a prolonged duration.

EXAMPLE

Examples of treatment of optical character reading disks consisted of the following steps:

- An alkaline solution consisting of 20% soda at 36° C. and 80% water was prepared;
- A quantity of loose, uncrushed disks was prepared. This quantity was less than 50% of the total volume of the rotary treatment drum used;
- The disks were introduced into the treatment drum;
- A quantity of solution, the weight of which was from 1 to 2% of the weight of the waste to be treated was introduced into the treatment drum;
- Rotation of the treatment drum was initiated.
- Speed was regulated so that the waste material rose as high as possible within the drum without, however, effecting a complete rotation under the influence of centrifugal force. The mechanical and chemical treatment in the drum lasted from 2 to 5 hours until the layers of aluminum and printing ink detached completely from the respective disk surfaces and combined with the treatment solution to form a sludge.
- The drum contents were poured into a rinse drum;
- A large quantity of water within the rinse drum rinsed the disks until clean;
- The rinse water was emptied and the disks dried inside the moving rotary drum by subjecting them to a stream of hot air;
- The dried disks were moved through a crushing device to a storage silo;
- The rinse water was filtered and the plate filter cleaned.

The device for implementing the foregoing method consists of a rotary treatment drum 10 in which the chemical process as well as the mechanical recovery process take place, and a rotary rinsing drum 11 in which the recovered disks are rinsed and dried. A jet of hot air 12 is associated with drum 11 for this purpose. This device further comprises a crushing means 13 and a storage silo 14 associated with a device 15 for packing the crushed waste material.

Finally, the device comprises a vessel 16 disposed downstream of drum 11 for recovering the rinse liquid, a pump 17 for forcing the liquid toward a plate filter 18 which has at its outlet a reservoir 19 with an evacuation outlet 20 for the liquid, which may be reprocessed and recycled.

The waste treatment procedure of the invention may also take place using only one rotary drum for both chemical treatment and rinsing. In this case the resulting "juice" would be evacuated through a turning connector.

I claim:

1. A method for recovering synthetic material from waste articles made substantially of said synthetic material and having surfaces contaminated with other materials, comprising the simultaneous steps of:

a) chemically treating said other materials by impregnating said other materials with a chemical solution which aggressively degrades and removes said other materials but is substantially neutral toward said synthetic material, and b) mechanically treating said waste articles by bulk tumbling said waste articles in a hermetically closed rotary drum, wherein said treatment steps a) and b) are performed simultaneously by introducing said waste articles into said drum in an uncrushed and uncomminuted condition and providing said chemical solution in said drum in an amount of between 1% and 5% in weight of the waste articles before performing said treatment steps.

2. A method according to claim 1, wherein said waste articles are optical disks, said synthetic material is polycarbonate, and wherein said chemical solution is composed of 20% caustic soda at 36° C. and 80% water.

3. A method according to claim 2, wherein said chemical and mechanical treatments have a duration from 3 to 5 hours.

4. A method according to claim 3, wherein after said treatments at least one rinse operation is performed using a rinse liquid ranging in volume from 20% to 100% of the volume of waste being treated, said operation being followed by a drying operation performed by drying the waste material with hot air.

5. A method according to claim 4, wherein after said rinse operation the rinse liquid is filtered through a plate filter.

6. A method according to claim 4, wherein said chemical and mechanical treatments take place within a first rotary drum and the rinsing and drying operations within a second rotary drum.

7. A method according to claim 4, wherein the waste articles are crushed after the rinsing and drying operations.

8. A method for recovering synthetic material from waste articles made substantially of said synthetic material and having surfaces contaminated with other materials, comprising the steps of:

simultaneously mechanically treating and chemically treating said waste articles by bulk tumbling said waste articles in a hermetically sealed rotary drum that is only partially filled with a chemical solution which aggressively degrades and removes said other materials but is substantially neutral toward said synthetic material.

9. A method according to claim 8, comprising the step of introducing said waste articles into said drum in an uncrushed and uncomminuted, substantially whole condition prior to treating said articles.

10. A method according to claim 8, comprising the step of providing said chemical solution in said drum in a quantity that is only a fraction by weight of the quantity of said waste articles in said drum, whereby the waste articles are repeatedly dipped during tumbling such that said solution impregnates said other material and an insubstantial amount of said solution is absorbed by the synthetic material of said waste articles.

11. A method according to claim 8, comprising the step of providing a quantity of said chemical solution in said drum equal to 1% to 5% in weight of the waste articles.

* * * * *